United States Patent [19]

Chalono

[11] Patent Number: 4,545,662
[45] Date of Patent: Oct. 8, 1985

[54] APPARATUS FOR SIMULTANEOUSLY TAKING SEVERAL SIMILAR PHOTOGRAPHS

[76] Inventor: Camille V. A. Chalono, 28, rue Léopold Mourrier, Cormeilles en Parisis-F-95240, France

[21] Appl. No.: 502,019

[22] PCT Filed: Sep. 16, 1982

[86] PCT No.: PCT/FR82/00151
§ 371 Date: May 18, 1983
§ 102(e) Date: May 18, 1983

[87] PCT Pub. No.: WO83/01124
PCT Pub. Date: Mar. 31, 1983

[30] Foreign Application Priority Data

Sep. 18, 1981 [FR] France ................................ 81 17614

[51] Int. Cl.$^4$ .............................................. G03B 41/00
[52] U.S. Cl. ..................................... 354/118; 354/150; 350/171
[58] Field of Search ............... 354/103, 118, 119, 122, 354/150, 295; 350/171, 292, 299

[56] References Cited

U.S. PATENT DOCUMENTS

| 1,456,425 | 5/1923 | Procoudine-Gorsky | 354/118 |
| 1,988,882 | 1/1935 | Thomas | 354/103 |
| 2,530,793 | 11/1950 | Thomas | 354/118 |
| 2,751,826 | 6/1956 | Harrison | 354/295 |
| 3,653,748 | 4/1972 | Athey | 350/171 |
| 3,905,684 | 9/1975 | Cook et al. | 350/171 |

FOREIGN PATENT DOCUMENTS 1047511 11/1966 United Kingdom .

Primary Examiner—A. A. Mathews
Attorney, Agent, or Firm—Edwin E. Greigg

[57] ABSTRACT

The invention relates to an apparatus which, in combination with a camera apparatus, permits simultaneously taking a plurality of identical photographs. The apparatus comprises an element having several mirrors which, in cooperation with a partially transparent mirror, forms in front of the lens of said camera apparatus a plurality of virtual images of the subject to be photographed. Casing ensures the connection between camera apparatus and the diverse associated optical elements, is mounted on a support of the cardan-type, it is rigidly connected to a lever permitting the subject to ensure himself the framing of the camera and at the same time to set the predetermined distance to be set between himself and the camera assembly.

5 Claims, 6 Drawing Figures

APPARATUS FOR SIMULTANEOUSLY TAKING SEVERAL SIMILAR PHOTOGRAPHS

The present invention relates to apparatus which permits taking of photographs of the type called "identity" by means of a single lens camera apparatus, preferably having instantaneous development, by addition of an optical assembly capable of forming in front of the lens of said apparatus a plurality of virtual images of a same object located in front of said optical assembly, in order to obtain for each shutter release of said apparatus a plurality of images on the film.

Single lens apparatus which permits obtaining a plurality of images of a same object by addition of a system of mirrors placed in front of the lens are known and utilized for a long time namely to effect pairs of stereoscopic photographs. Such systems always comprise 2N mirrors to effect N images, these mirrors moreover are immobilized following 2N distinct planes.

English patent No. 1.047.511 describes such an apparatus utilizing eight plane mirrors oriented according to eight distinct directions to lead in cooperation with the camera apparatus to the formation of four images on sensitive film. Systems of this type, due to the spacing of the exterior mirrors, give images which correspond to different observation angles, and as a consequence, to a different view orientation on each of the four photographs of a same series, contrary to that which is expected of such a system.

The present invention is essentially characterized by the fact that it reduces from 2N to N+1 the number of optical elements necessary in the formation of N intermediary virtual images, while reducing the differences of observation angles indicated above in such a way, that their effects are almost no longer discernable on the photographs of a same series. According to the invention, 2N mirrors of the prior Art are replaced by N mirrors operating in combination with a partially transparent mirror (element having at the same time the capacity of reflecting a part of the light received in the manner of a mirror, and of transmitting the rest without angular deviation in the manner of a transparent blade having parallel faces: thus it is a question in fact of a partially transparent mirror). The apparatus according to the invention simultaneously exploits the reflection and transmission capacities without deviation of a partially transparent mirror to effect a particular combination wherein Men of the Art will understand easily by reading the description which follows, for which reasons it is particularly advantageous. The act of reducing from 2N to N+1 the number of optical elements to be used, in itself is particularly advantageous in that it simplifies the operations of mounting and adjusting of the system.

In equipment for identity photographs functioning without an operator, where the subject himself must effect his framing, the camera assembly is fixed, and the subject must modify the height of the seat to assure a good framing in height, moreover this seat fixes the transversal framing as well as the predetermined distance between the subject and said camera assembly, thus it cannot be moved following one or the other of the two directions of the horizontal plane and is an integral part of the equipment. In reality, the adjustment of this seat frequently leads to several attempts, fastidious for the subject himself as well as for people who, sometimes, form a waiting line. Another characteristic of the apparatus according to the invention tends to facilitate the above preliminary adjustments, it resides in the combination of three means permitting a particularly easy and rapid adjustment of the framing and of the distance while eliminating the necessity of a fixed seat associated with this system.

The first means is a suspension system of the camera assembly permitting at the same time modifying the orientation of this assembly, which permits effecting the framing in height and in width, and modifying the distance between the camera assembly and the subject; it comprises an assemblage of cardan-type (wherein one axis is vertical and the other horizontal), connected to an arm capable of pivoting around it's vertical part. The second means makes in a permanent manner the distance to be respected between the subject and the camera assembly, it is constituted by a rigid lever wherein the end must be brought into contact with the subject the other end being integral with said camera assembly, this orientation lever gives the subject the means for imposing on the camera assembly orientation or distance modifications rendered possible by the first means.

The third means permits the subject to determine the orientation of the camera assembly which corresponds to a correct framing of the images, it does not constitute an action means but a control only. The apparatus is furnished moreover with a shutter release means for the camera operated by the subject himself, thus it's use does not require the presence of a separate operator. Other details and characteristics of the apparatus according to the invention will appear in the description which follows in referring to the annexed drawings in which.

Figure 3:
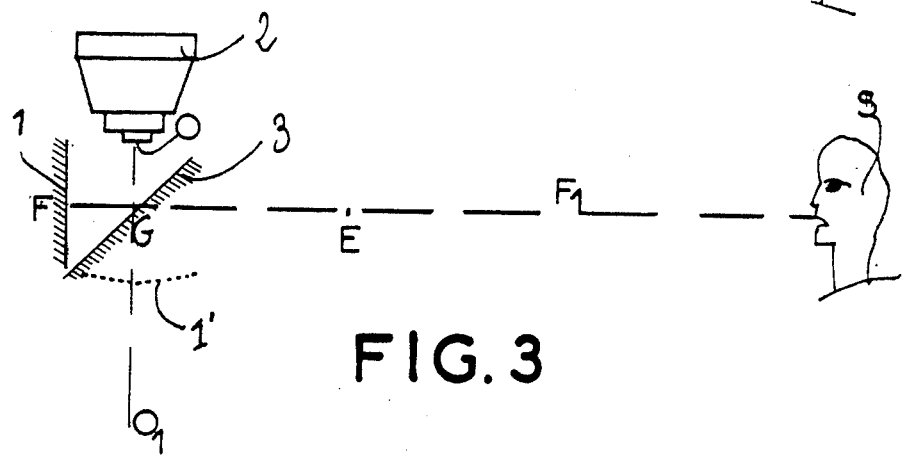
Figure 5:
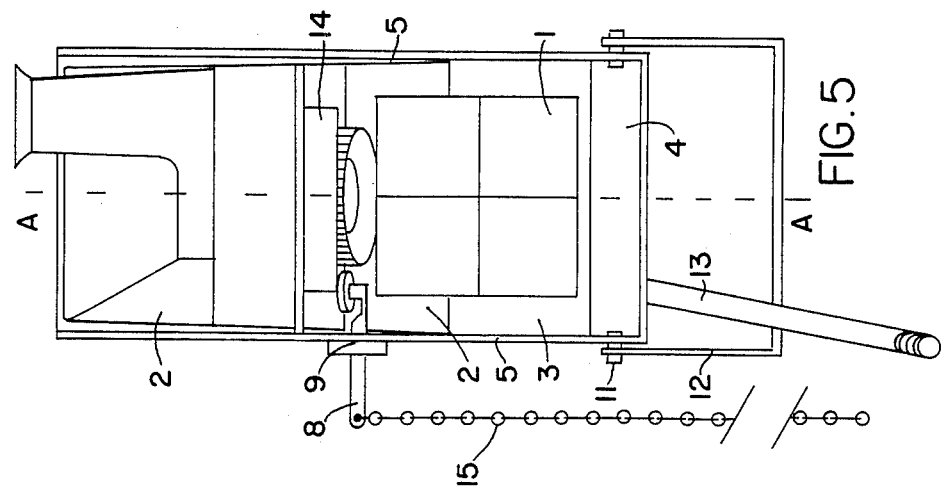
Figure 4:
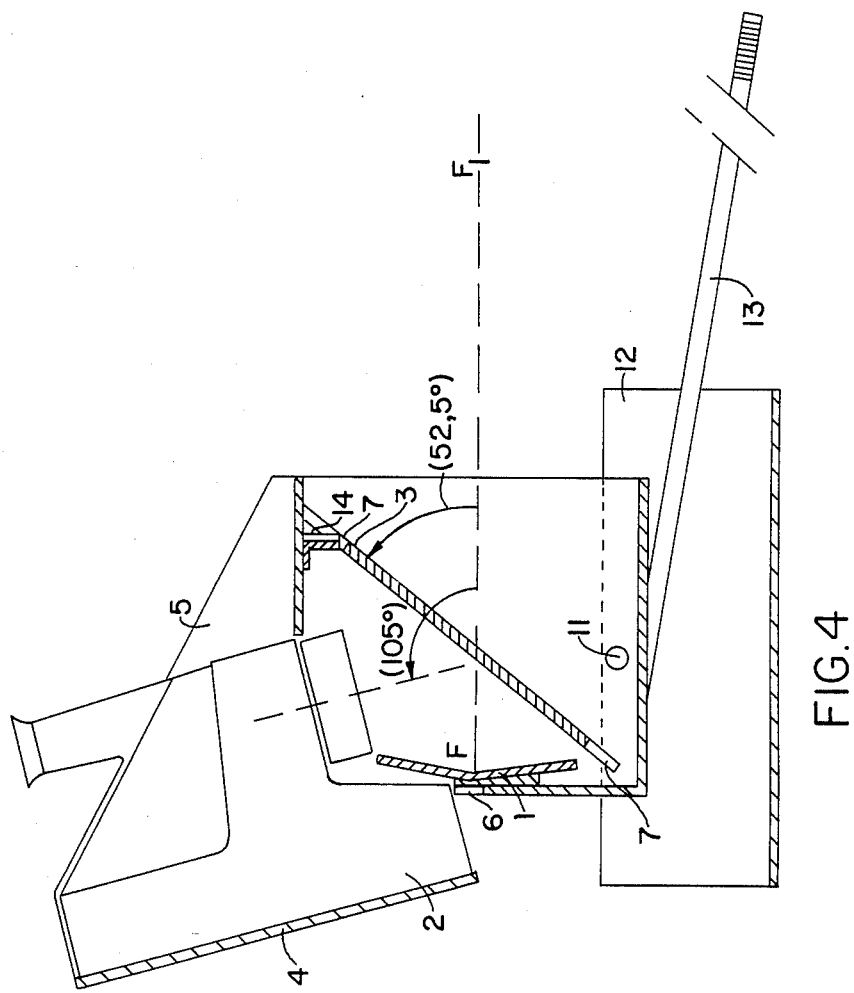

FIG. 3 indicates the relative positions of the camera apparatus, the optical elements of the apparatus according to the invention, and the subject;

FIG. 4 is a vertical cross-section passing through axis $FF_1$ of the apparatus mounted on table support and a cross-section along A—A of FIG. 5.

Figure 6:
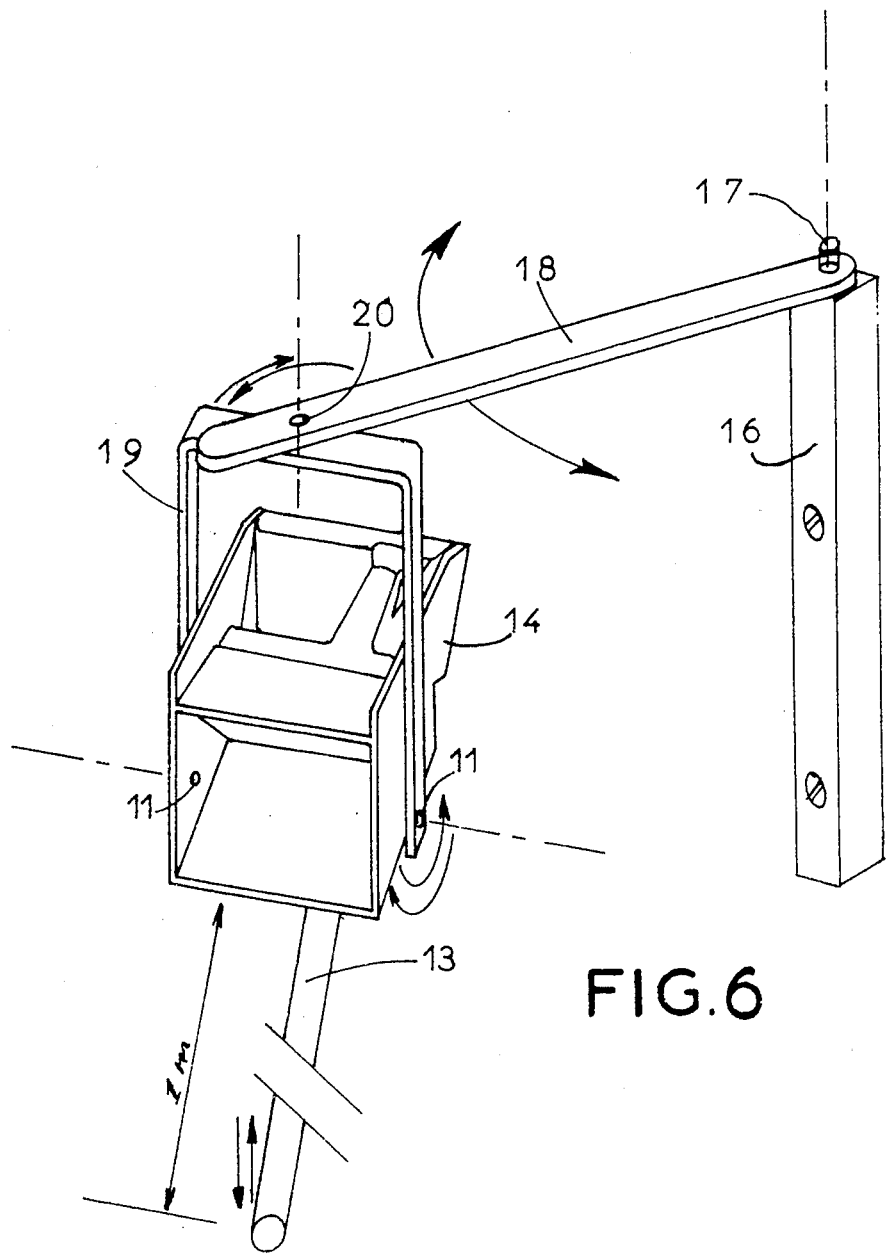

FIG. 6 is a perspective view of the wall support having pivoting arm.

Figure 1:
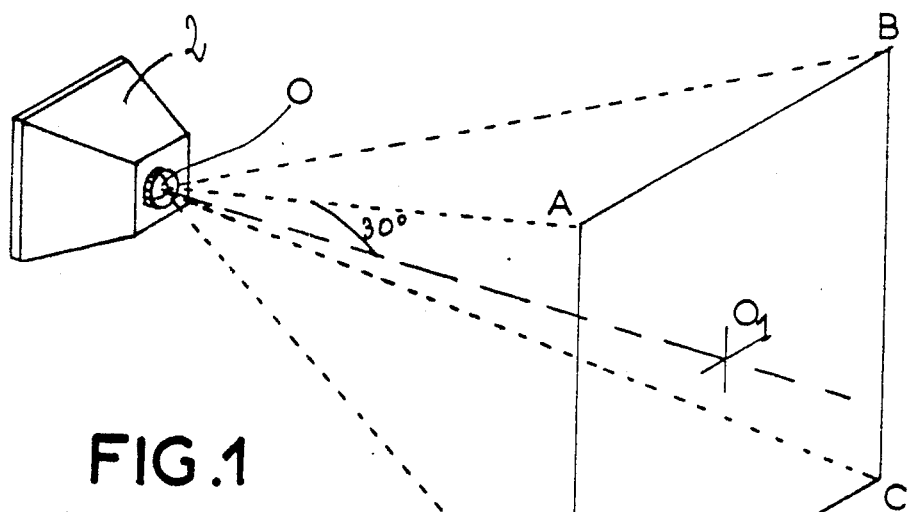
FIG. 1 represents the field of the camera apparatus around which is constructed the apparatus according to the invention.
Figure 2:
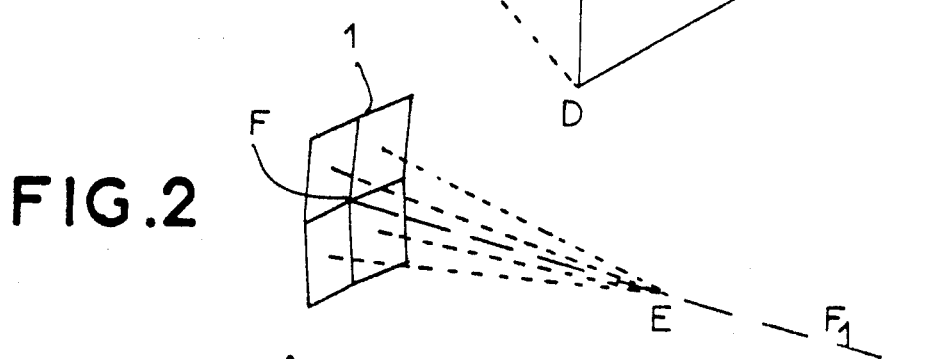
FIG. 2 is a perspective view of the optical element (1) of the apparatus.

For clarity of the explanations which follow, the field of camera apparatus (2) utilized in the apparatus is made in the form of a regular pyramid having a squared base: 0 A B C D, wherein the axis of symmetry $0\ 0_1$ is coaxial with the optical axis of said apparatus as represented in FIG. 1. Distance $0\ 0_1$ of apparatus (2) to the "object plane" is on the order of 1 m 20; in relation to axis $0\ 0_1$, points A, B, C, and D are seen from lens 0 of apparatus (2) under an angle neighboring on 30°. The apparatus according to the invention comprises two essential optical elements: first element (1) is constituted by four mirrors of substantially squared form, identical among themselves, and wherein each has two adjacent sides in contact with a side of each of the neighboring mirrors, as represented in FIG. 2. The mirrors of element (1) on opposite sides of partially reflection mirrors thus determine the apex of a regular pyramid, the perpendiculars rising from the center of each mirror of element (1) form an angle of 7.5° with axis of symmetry $F\ F_1$ and all converge to a same point E of this axis. Second element (3) is a partially reflective mirror wherein the specific property is, for a determined incidence, generally of 45°, to reflect substantially 50% of the light received, and to transmit the rest without deviation. Elements (1) and (3) cooperate in the following manner: let S be the face to be photographed, element (1) is oriented in such a way that its axis of symmetry F F₁ passes through the central region of S, thus this axis generally is neighboring on the horizontal, the distance separating S from element (1) is approximately one meter; partially reflective mirror (3) rectangular or squared shape having center G is interposed between S and element (1) at a close proximity to this latter, as indicated in FIG. 3 and in such a way that center G of partially reflective mirror (3) finds itself on F F₁, the perpendicular to partially reflective mirror (3) passes through G or in the plane of symmetry of the apparatus and forms an angle of 45° with axis F F₁. In this configuration, apparatus (2) is itself located in such a manner that it finds itself on the same side of partially reflective mirror (3) as element (1), the optical axis of apparatus lens (2) is perpendicular at G to axis FF1 belonging to said plane of symmetry, the optical center 0 of said lens responds by it's position to the condition: $FG + GO = FE/2$.

In these conditions, apparatus (2) "sees" the image of element (1) noted (1') in FIG. 3, as well as the virtual images of S appearing in the mirrors of element (1). The dimension of the mirrors constituting assembly (1) must be sufficient so that this assembly "covers", by means of it's image (1'), the entirety of the field of the apparatus (2). The transparence neighboring on 50% of partially reflective mirror (3) has as a consequence to render visible for the apparatus (2) all of the region found in the field past said separating blade; in the same way, the virtual image of apparatus (2) formed by partially reflective mirror (3) also is visible in the mirrors of element (1), these undesirable images cannot be physically eliminated, but in reality, it suffices to reduce their intensity below the threshold of sensitivity of the film so they will not appear after development. This result is obtained by means of casing (4) wherein the role is to fasten elements (1), (2) and (3) in the relative positions indicated above and at the same time to oppose itself to excessive penetration and diffusion of light adapted to contribute to the formation or the reinforcement of images and of undesirable reflections. To this end, casing (4) is closed on all sides except the side opposite element (1) and the side by which an image is into introduced apparatus (2), these interior walls are of a dark color and non-reflecting.

Of course, Men of the Art will understand easily that it is equally possible, without departing from the spirit of the invention, to arrive at a similar result by placing element (1) in the place of image (1') or by giving to the angle formed by $0\ 0_1$ and F F₁ a value other than 90° such as that adopted in the embodiment described hereafter being an illustrative but nonlimiting example of the invention.

Camera apparatus (2) is an apparatus having instantaneous development, it is introduced in casing (4) wherein sides (5) guide it until it comes in contact with the edge of partition (6) on which is fastened element (1) as indicated in FIG. 4. Sides (5) of casing (4) comprise two throats (7) in which is engaged partially transparent mirror (3) of the dimension 100×100 mm. The assembly is made in a manner such that partially transparent mirror (3) and the optical axis of apparatus (2) respectively form with the axis of the subject aimed at F F₁ angles of 52.5° and 105°. The mirrors constituting element (1) are of squared shape and of dimension 35×35 mm., the perpendiculars passing through the centers of these mirrors cross each other as indicated above at E and form with F F₁ angles of 7.5°. A release shutter lever (8) mobile around an axis (9) fastened at one of sides (5) of the casing, permits acting from the exterior on the release shutter button of the apparatus (2); the free end of lever (8) is furnished with a small chain (15) permitting the subject himself to set off the camera. Casing (4) is integral by means of two pivots (11) of a U-shaped base (12) constituting the table support, these pivots permitting the rotation of casing (4) around their axis (horizontal).

An orientation lever (13), fastenend rigidly on the lower face of casing (4), permits the subject himself to orient the camera assembly. The length of orientation lever (13) is one meter approximately which corresponds to the predetermined distance which must be respected between the subject and the camera asembly to obtain a good clarity of images, apparatus (2) itself being adjusted to the distance of one meter twenty, real optical distance between the subject and the lens.

A mirror (14) is fastened inside casing (4), by it's small dimension: 10×65 mm., it only allows the subject to perceive a very small part of his own image changing in function of the position the he gives to orientation lever (13). Mirror (14) is fastened in such a way that when the subject sees his eyes in mirror (14), the relative positions of the camera assembly and his face correspond to a correct framing of the images. In reality, the long sides of mirror (14) are horizontal so as to permit an easy finding of the eye region and a very precise adjustment of the framing in height.

When, in certain circumstances, it is desirable to reduce the bulkiness on the ground of the apparatus, base (12) is replaced by the wall support represented in FIG. 6. This support is comprised of a column (16) vertically fastened on a wall and comprising an axis (17) which ensures the maintenance and the possibility of rotation on a horizontal plane of arm (18). A suspension bracket (19) is rendered integral with casing (14) by means of pivots (11), another assemblage pivot (20) of vertical axis ensures moreover the assemblage of bracket (19) and of the end of arm (18). This wall support thus permits all movements necessary to obtain the orientation and the adjustment of the distance indicated above, without obliging the subject to move.

I claim:

1. A camera apparatus comprising a camera having a shutter and a lens which permits taking of a plurality of identical contiguous photographs of a desired subject for each shutter release, an optical system in optical alignment with said camera adapted to form N distinct virtual images of a same object in front of said lens of said camera, said optical system comprising in combination N mirrors and a partially transparent mirror positioned relative to each other on an optical axis.

2. A camera apparatus according to claim 1 wherein said N mirrors and said partially transparent mirror are positioned relative to said camera such that said camera is located in a space of said camera apparatus relative to a plane defined by said partially transparent mirror which is on a side of said plane defined by said partially transparent mirror which is opposite to that in which the subject to be photographed is found and said N mirrors form an apex of a regular pyramid having an axis of symmetry (FF1) which passes substantially through a center (G) of said partially transparent mirror wherein a perpendicular to said partially transparent mirror at said center (G) forms an angle different by n.π/2 with said axis of symmetry.

3. A camera apparatus according to claim 2, in which said N mirrors are located in said space of said camera apparatus on a side of said partially transparent mirror in which said camera is located, wherein an optical axis (0 01) of said camera apparatus is along a plane defined by said axis of symmetry (F F1) of said N mirrors and said perpendicular to said partially transparent mirror coming from its center (G), and passes through said center (G) of said partially transparent mirror thereby forming an angle with said perpendicular which is equal and adjacent to that formed by said perpendicular and the axis of symmetry in such a way that an image of the subject comes to said lens of said camera after successively having crossed said partially transparent mirror and then reflected on N mirrors then on said partially transparent mirror.

4. A camera apparatus according to claim 2, in which said N mirrors are located in a space on a side of said partially transparent mirror in which said subject to be photographed is found, wherein an optical axis (0 01) of said camera apparatus is aligned with an axis of symmetry (F F1) of said N mirrors in such a way that an image of said subject comes to said lens (0) of said camera after successively being reflected first on said partially transparent mirror, then on said N mirrors and then having crossed said partially transparent mirror.

5. A camera apparatus as set forth in claim 1 wherein the letter N represents four mirrors.

* * * * *